United States Patent
Abdo et al.

(10) Patent No.: US 10,985,900 B1
(45) Date of Patent: Apr. 20, 2021

(54) ESTIMATING CLOCK PHASE ERROR BASED ON CHANNEL CONDITIONS

(71) Applicant: Ciena Corporation, Hanover, MD (US)

(72) Inventors: Ahmad Abdo, Ottawa (CA); Shahab Oveis Gharan, Ottawa (CA); James Harley, Ottawa (CA); Sadok Aouini, Gatineau (CA); Timothy James Creasy, Manotick (CA); Naim Ben-Hamida, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/807,356

(22) Filed: Mar. 3, 2020

(51) Int. Cl.
*H04L 7/033* (2006.01)
*H04L 7/04* (2006.01)
*H04L 7/06* (2006.01)
*H04L 7/00* (2006.01)

(52) U.S. Cl.
CPC .......... *H04L 7/0331* (2013.01); *H04L 7/0012* (2013.01); *H04L 7/048* (2013.01); *H04L 7/06* (2013.01)

(58) Field of Classification Search
CPC ......... H04L 7/0012; H04L 7/02; H04L 7/033; H04L 7/0331; H04L 7/04; H04L 7/048; H04L 7/06; H04L 7/065
See application file for complete search history.

(56) References Cited

U.S. PATENT DOCUMENTS

| | | | |
|---|---|---|---|
| 8,005,368 B2 * | 8/2011 | Roberts | H04B 10/532 398/150 |
| 10,063,367 B1 | 8/2018 | Aouini et al. | |
| 10,243,671 B1 | 3/2019 | Aouini et al. | |

OTHER PUBLICATIONS

Gardner, "A BPSK/QPSK Timing-Error Detector for Sampled Receivers", IEEE Transactions on Communications, vol. COM-34, No. 5, pp. 423-429, May 1986.
Godard, "Passband Timing Recovery in an All-Digital Modem Receiver", IEEE Transactions on Communications, vol. COM-26, No. 5, pp. 517-523, May 1978.
Huang et al., "Performance analysis of blind timing phase estimators for digital coherent receivers", Optics Express, vol. 22, No. 6, pp. 6749-6763, Mar. 24, 2014.
Pfau et al., "Towards Real-Time Implementation of Coherent Optical Communication", 10.1364/OFC.2009.OThJ4, 2009.

* cited by examiner

*Primary Examiner* — Diana J. Cheng
(74) *Attorney, Agent, or Firm* — Young Basile Hanlon & MacFarlane, P.C.

(57) ABSTRACT

Managing clock-data recovery for a modulated signal from a communication channel comprises: receiving the modulated signal and providing one or more analog signals, providing one or more digital input streams from samples of the analog signals, and processing the digital input streams to provide decoded digital data. The processing comprises: determining the decoded digital data based on information modulated over a plurality of frequency elements associated with the modulated signal, based at least in part on transforms of the digital input streams; a clock signal based on clock recovery from the digital input streams; and determining a clock phase error estimate associated with the determined clock signal based at least in part on a sum that includes different weights multiplied by different respective summands corresponding to different sets of frequency elements.

20 Claims, 6 Drawing Sheets

ESTIMATING CLOCK PHASE ERROR BASED ON CHANNEL CONDITIONS

TECHNICAL FIELD

This disclosure relates to estimating clock phase error based on channel conditions.

BACKGROUND

Clock phase error (CPE) detectors (also called "timing estimators") are used within communication systems. For example, a CPE detector can be used as input to a jitter tracking circuit, or other circuitry used for clock-data recovery.

SUMMARY

In one aspect, in general, an apparatus for managing clock-data recovery for a modulated signal from a communication channel comprises: input module configured to receive the modulated signal and provide one or more analog signals; or more analog-to-digital converters (ADCs) configured to provide one or more digital input streams from samples of the analog signals; and a digital signal processing module configured to process the digital input streams to provide decoded digital data. The processing comprises: determining the decoded digital data based on information modulated over a plurality of frequency elements associated with the modulated signal, based at least in part on transforms of the digital input streams; determining a clock signal based on clock recovery from the digital input streams; and determining a clock phase error estimate associated with the determined clock signal based at least in part on a sum that includes different weights multiplied by different respective summands corresponding to different sets of frequency elements.

In another aspect, in general, a method for managing clock-data recovery for a modulated signal from a communication channel comprises: receiving the modulated signal and provide one or more analog signals; providing one or more digital input streams from samples of the analog signals; and processing the digital input streams to provide decoded digital data. The processing comprises: determining the decoded digital data based on information modulated over a plurality of frequency elements associated with the modulated signal, based at least in part on transforms of the digital input streams; a clock signal based on clock recovery from the digital input streams; and determining a clock phase error estimate associated with the determined clock signal based at least in part on a sum that includes different weights multiplied by different respective summands corresponding to different sets of frequency elements.

Aspects can include one or more of the following features.

One or more of the weights are determined based at least in part on measurements characterizing one or more conditions of the communication channel.

The measurements include a plurality of measurements of signal-to-noise ratio (SNR) for different respective frequency elements.

At least a first set of frequency elements of the different sets of frequency elements comprises a pair of frequency elements including: a first frequency element associated with a frequency within a lower roll-off region of a frequency spectrum of the modulated signal, and a second frequency element associated with a frequency within an upper roll-off region of the frequency spectrum.

At least one weight multiplied by a first summand corresponding to a first set of frequency elements comprises a function of: a first measurement of SNR for the first frequency element, and a second measurement of SNR for the second frequency element.

The function comprises at least one of: an average, or a minimum.

At least one summand corresponding to the first set of frequency elements comprises a phase difference between the first frequency element and the second frequency element.

The frequency spectrum of the modulated signal corresponds to a spectral band within a multi-carrier spectrum that includes multiple spectral bands for different respective channels, where each spectral band is modulated around a different respective carrier frequency.

The multiple spectral bands within the multi-carrier spectrum are modulated around their respective carrier frequencies based on a base carrier signal that is digitally modulated into the different spectral bands.

The communication channel comprises an optical communication channel that provides an optical wave having a modulated first linear polarization component that is processed to yield a frequency domain representation associated with the plurality of frequency elements, and a modulated second linear polarization component that is processed to yield a frequency domain representation associated with the plurality of frequency elements.

The one or more conditions include at least one of a condition associated with a time-dependent frequency response, a condition associated with polarization mode dispersion, a condition associated with polarization dependent loss, a condition associated with optical-to-electrical signal conversion, a condition associated with electrical-to-optical signal conversion, a condition associated with digital-to-analog conversion, or a condition associated with analog-to-digital conversion.

The communication channel comprises a wireless communication channel that provides a modulated electromagnetic wave processed to yield a frequency domain representation associated with the plurality of frequency elements, wherein the one or more conditions include a condition associated with frequency-selective fading.

The processing further comprises providing the clock phase error estimate as feedback for the clock recovery; and/or providing the clock phase error estimate for data sampling by one or more of the ADCs.

One or more of the weights are determined repeatedly.

A frequency at which the weights are determined is programmatically determined to be lower than a frequency at which the clock phase error estimate is determined.

Each of the weights is compared to a programmable threshold to determine whether the weight is set to zero based on the comparison.

The weights are determined such that a sum of all of the weights is scaled to ensure that a magnitude of the clock phase error is within a predetermined range.

A gain of at least one control loop associated with the digital signal processing module is adjusted based on a signal-to-noise ratio characterizing at least a portion of at least one of the digital input streams.

Aspects can have one or more of the following advantages.

As the speed of communication systems that use clock and data recovery (CDR) increase, the fidelity of the CDR functional modules is becoming more important. Techniques to reduce phase error on the recovered clock enable modules that rely on an accurate clock (e.g., for sampling of signals) to perform with higher accuracy. The clock phase error estimation techniques described herein are able to adapt to potentially changing channel conditions. The resulting improvement in clock recovery reduces the risk of timing errors such as cycle slipping during operation of an Analog-to-Digital converter (ADC), and the resulting degradation of signal-to-noise ratio (SNR). These techniques are especially useful in the context of communication systems that use high sampling and/or baud rates, and/or closely spaced channels in frequency division multiplexing (FDM) (also called super-channel in dense wavelength division multiplexing (DWDM) systems).

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
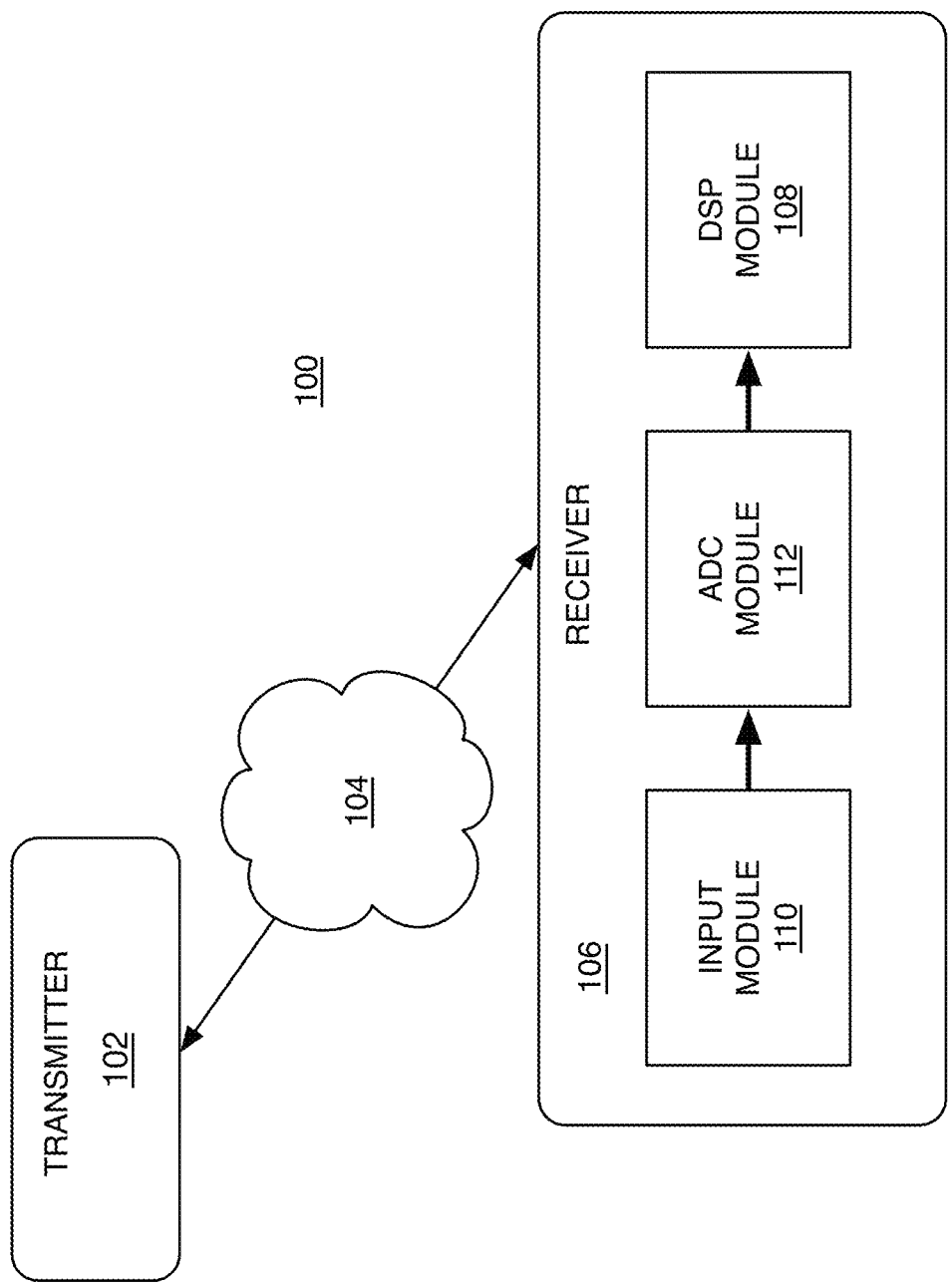
FIG. 1 is block diagram of an example communication system.

Referring to FIG. 1, a communication system 100 includes a transmitter 102 that sends signals that have been modulated with data over a communication channel 104 to a receiver 106. The communication channel 104 can include one or more types of communication media (e.g., arranged within a communication network), which together transmit the signals from the transmitter 102 to the receiver 106. In some implementations, the communication channel 104 can represent a link within a larger communication network in which the transmitter 102 and/or the receiver 106 are at intermediate nodes of the network. The communication media used to provide the communication channel 104 can include: optical fiber, wired transmission media, wireless links (e.g., between transmitting and receiving antennas), for example.

Different types of communication channels can be characterized by different kinds of channel conditions due to various impairments or other factors that can affect various aspects of the communication channel. In some cases, a communication channel that uses a particular kind of communication medium (e.g., a wireless link) may experience particular kind of impairment (e.g., multi-path fading) that is not experienced by other kinds of communication channels (e.g., wired transmission lines or optical fiber links). But, there may be different kinds of impairments that all have similar effects (e.g., frequency-selective fading) on a channel's spectrum even if those effects are caused by different physical phenomena. Examples of different kinds of channel conditions that can change over time and that the techniques described herein can dynamically adapt to include:

Imperfections in electrical-to-optical frequency responses, in phase and/or amplitude, at transmitter and/or receiver.

Droop in amplitude response associated with an ADC (e.g., at a receiver), and/or with a digital-to-analog converter (DAC) (e.g., at a transmitter).

Carrier leak between FDM channels.

Leaked power from neighboring channel in flexible-grid networks.

Filtering effect in fixed-grid networks.

Interaction between polarization dependent loss (PDL) and polarization mode dispersion (PMD) in long-haul fiber-optic transmissions.

The receiver 106 includes circuitry for managing clock-data recovery for a modulated signal from the communication channel 104. One aspect of that clock-data recovery is clock recovery based on a clock phase error estimate generated by a CPE estimator. In some implementations, the CPE estimator is configured to use dynamic frequency bin weighting, which can be performed digitally using a digital signal processing (DSP) module 108 in the receiver 106. In this example, an input module 110 is configured to receive the modulated signal and provide one or more analog signals. An ADC module 112 includes one or more analog-to-digital converters (ADCs) configured to provide one or more digital input streams from samples of the analog signals. The DSP module 108 is configured to process the digital input streams to provide decoded digital data using clock recovery. In some implementations, the DSP module 108 performs at least some of the processing on the digital input streams in the frequency domain based on information modulated over multiple frequency elements associated with the modulated signal. For example, the frequency elements can be samples of a complex frequency domain representation generated using a discrete transform (e.g., a Discrete Fourier Transform) of time domain samples of the digital input streams. The DSP module 108 is able to determine a clock signal for use by the ADC module 112 based on clock recovery from the digital input streams. As part of the processing, the DSP module 108 determines a clock phase error estimate associated with the determined clock signal. As will be described in more detail below, this clock phase error estimate can be computed based at least in part on a sum that includes different weights multiplied by different respective summands corresponding to different sets of frequency elements.

Figure 2:
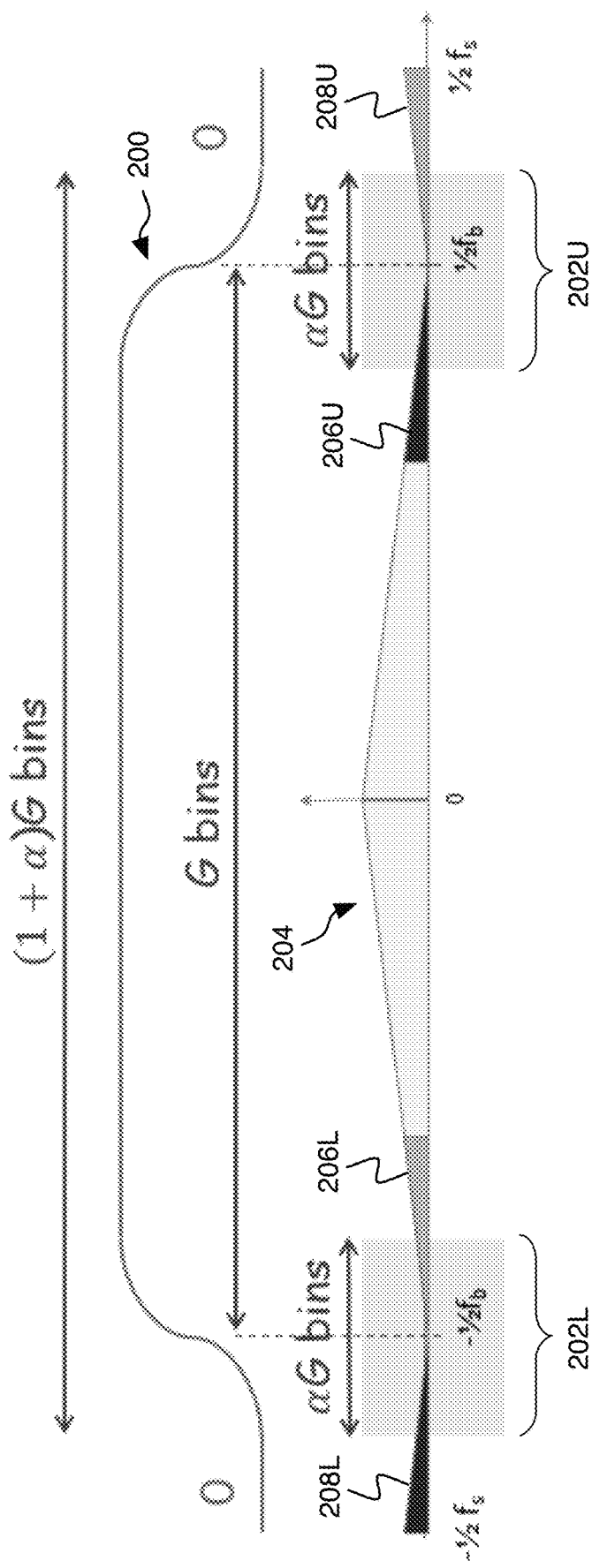
FIG. 2 is a plot of an example spectrum of a transmission filter.

In some implementations, the transmitter 102 is configured to apply a filter that has a predetermined spectral shape to a modulated signal that is being transmitted. For example, as shown in FIG. 2, one type of transmission filter has a spectrum 200 with a root-raised cosine shape with a roll-off factor $\alpha$. Other examples of the predetermined spectral shape can have different characteristics, including different shapes over the roll-off regions, or other regions. Based on the number of samples in the time domain and frequency domain representations of the digital version of the signal, the analog spectrum can be described as having a number of frequency bins in its spectrum. The width of each bin in the frequency domain is related to the number of samples taken in the time domain in a given interval of time (which is generally greater than or equal to a Nyquist sampling rate). In this example, the transmitted spectrum has non-zero amplitudes within $N=(1+\alpha)G$ bins. There are G bins between the midpoint of the lower sideband roll-off region 202L and the midpoint of the upper sideband roll-off region 202U. These G bins contain the original spectrum 204 of the modulated signal, represented in this example as having a triangular shape centered around a carrier frequency at 0 on the horizontal frequency axis. Before applying the transmission filter, the transmitter 102 copies an upper sideband signal portion 206U to a lower spectral region 208L, and copies a lower sideband signal portion 206L to an upper spectral region 208U. Within each of the roll-off regions 202L and 202U, there are then αG bins with useful information about the spectrum of the original signal. While some of that information may be redundant, since there are potentially channel conditions that affect the two regions differently, this redundancy can be helpful to recover information that will be used for clock recovery, as described in more detail below. As an example, G may be about 800 and α may be about 0.125, such that N is about 900.

The following is an example of operations that can be performed in the receiver 106 when processing a received signal. Some of the equations will be described in terms of operations in the frequency domain. But, operations performed in the frequency domain generally have equivalent operations that could alternatively be performed in the time domain, and vice versa. For example, a shift in the time domain corresponds to a phase ramp in the frequency domain. So, other implementations could perform operations in either or both of the time domain and/or frequency domain and still achieve an equivalent effect.

The receiver 106 performs computations on the frequency elements, expressed here as complex transform coefficients that are implicitly associated with a particular frequency sample within a corresponding frequency bin. In the following notation, frequency elements corresponding to a bin that is within the lower sideband roll-off region 202L (a "lower frequency element") are denoted as $X_L$, and frequency elements corresponding to a bin that is within the upper sideband roll-off region 202U (an "upper frequency element") are denoted as $X_U$. An example of one of the operations that the receiver 106 can perform is a correlation over frequency elements in the different regions 202L and 202U, which can be expressed by either of the following equations.

$$\hat{\varphi} = \frac{N}{G} \angle \langle X_U X_L^* \rangle \quad (1)$$

$$\hat{\varphi} = \frac{N}{G} \angle \left( \frac{1}{N_{SSB}} \sum_{ssb} X_U X_L^* \right) \quad (2)$$

The N/G scaling factor in these equations, which converts from symbol phase to sampling phase, could alternatively be expressed in terms of the roll-off factor α. Equation (1) expresses the clock phase error estimate using a correlation function that computes the phase angle of a complex value that is an average of a product of an upper frequency element with the complex conjugate of a lower frequency element, as described in more detail, for example, in Godard, "Passband Timing Recovery in an All-Digital Modem Receiver," IEEE Transactions on Communications, Vol. COM-26, No. 5, May 1978, incorporated herein by reference. Equation (2) expresses the average in Equation (1) as a summation of that product for corresponding upper and lower frequency element pairs (spaced at equal distances from the center carrier frequency) over the number of bins in a single sideband NSSB The summation in Equation (2) can be expressed as follows (in equation (3a) when the complex amplitudes are expressed in terms of a real magnitude and phase $X_U = r_U e^{\theta_U}$ and $X_L = r_L e^{\theta_L}$. Equation (3b) shows the same expression for clock phase error estimate where the scaling factor is shown in terms of the roll-off factor α.

$$\hat{\varphi} = \frac{N}{G} \angle \left( \frac{1}{N_{SSB}} \sum_{ssb} r_U e^{\theta_U} r_L e^{-\theta_L} \right) \quad (3a)$$

$$\hat{\varphi} = (1+\alpha) \angle \left( \frac{1}{N_{SSB}} \sum_{ssb} r_U e^{\theta_U} r_L e^{-\theta_L} \right) \quad (3b)$$

When ignoring the real magnitudes $r_U$ and $r_L$, the resulting summand has a term whose complex unit-magnitude phasor $e^{\theta_U - \theta_L}$ holds the timing error information. In different alternative implementations, equivalent timing error information can be represented in any of a variety of forms. For example, instead of a phase angle of a sum of the product of complex amplitudes, the correlation can be computed using a sum of the imaginary parts of products of complex amplitudes.

However, using such a strict correlation function where each bin in the upper and lower sidebands is weighted equally, dynamic information about the current condition of the communication channel 104 can be taken into account using a weighted estimation technique. So, instead of using a strict correlation to compute a CPE estimate, the receiver 106 can be configured to compute a weighted CPE estimate in which different bins are able to have a different contribution to the resulting estimate. For example, as the amplitude of a complex vector decreases, the phase noise for that complex vector may increase, and therefore may need to have a lower contribution. In addition to improving the fidelity of the clock phase, a weighted CPE estimate can increase the SNR performance and reduce the risk of cycle slip (e.g., receiving a portion of a following symbol instead of the desired symbol). The weighted CPE estimate can accommodate upsampling (e.g., by 2) and/or fractional upsampling of transmitted symbols.

To take into account dynamic information about the channel conditions in the weighted CPE estimate, the receiver 106 is able to compute a measure of SNR at the output of an adaptive filter applied to the spectrum of the received signal. The SNR measures can be used to compute an updated set of weights as part computing a new CPE estimate. Updated weights can be computed for every new CPE estimate, or at predetermined or dynamically determined intervals during the computation of new CPE estimates. In one example, a weighted CPE estimate can be computed as follows.

$$\hat{\varphi} = \frac{N}{G} \angle \left( \frac{1}{N_{SSB}} \sum_{i=1...K} \text{Weight}(i).X_U X_L^* \right) \quad (4)$$

In this example, K corresponds to the number of bins used in the calculation, which may include some or all of the bins for the upper frequency elements and lower frequency elements, respectively.

Figure 3A:
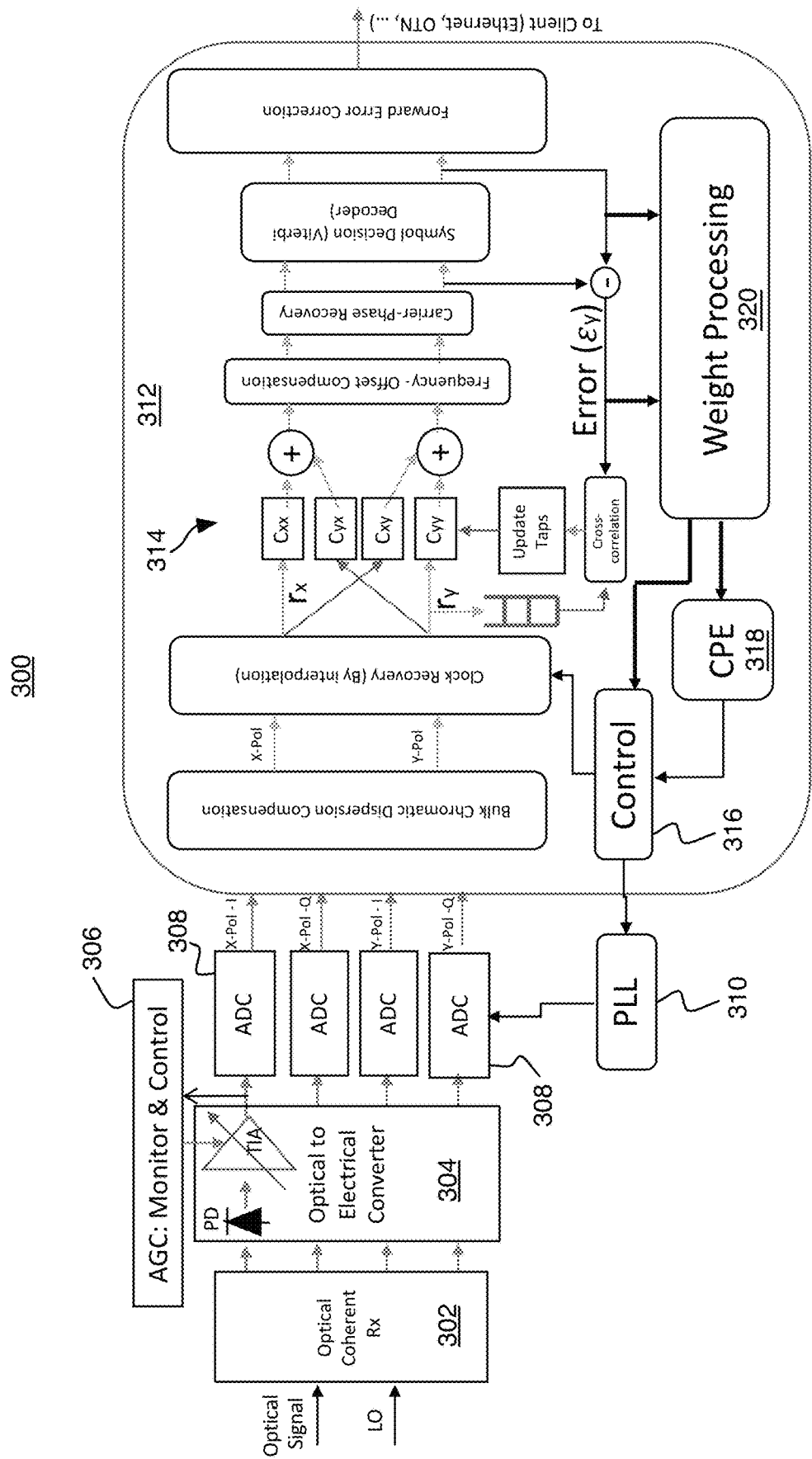
FIG. 3A is a block diagram of an example optical receiver system.

FIG. 3A shows in example of an optical receiver system 300 that uses CDR techniques and is able to implement the weighted CPE estimation techniques of the receiver 106. The system 300 includes an optical coherent receiver 302 that accepts a modulated optical signal and provides one or more optical signals after mixing with a local oscillator (LO) that is coherent with the optical signal, such as an in-phase (I) component of an first linear polarization of the optical signal (X-Pol), a quadrature-phase (Q) component of the first linear polarization, an in-phase (I) component of a second linear polarization of the optical signal (Y-Pol), and a quadrature-phase (Q) component of the second linear polarization. These optical signals are converted to corresponding electrical signals (e.g., voltage signals) after conversion by an optical-to-electrical conversion module 304, for example, using a photodetector (PD) to generate a current signal from each detected optical signal and a transimpedance amplifier (TIA) to generate an amplified voltage signal from the generated current signal. An automatic gain control (AGC) module 306 is able to monitor the outputs and control the settings of the module 304 including the TIA gain settings.

A set of analog-to-digital converters (ADCs) 308 use a clock signal provided by a phase-locked loop (PLL) 310 to convert the set of analog voltage signals to digital data streams corresponding to the original optical signals (e.g., X-Pol-I, X-Pol-Q, Y-Pol-I, Y-Pol-Q). The PLL 310 generates the clock signal based on an output of an oscillator (e.g., a voltage-controlled oscillator (VCO)) whose frequency and phase are determined by the PLL 310. One of the inputs to the PLL 310 is clock control information that is provided from a DSP module 312 that handles processing of digital information in the optical receiver system 300. In this example, the DSP module 312 includes various modules 314 implemented in hardware or firmware, for example, to perform functions such as bulk chromatic dispersion compensation on the digital input signals, clock recovery (e.g., by interpolation), adaptive filtering, frequency-offset compensation, carrier-phase recovery, symbol decision decoding (e.g., using a Viterbi decoder), and forward error correction. An output of the DSP module 312 provides decoded data to a downstream client according to a predetermined protocol (e.g., Ethernet, Optical Transport Network, . . . , etc.).

The adaptive filtering can be implemented, for example, using any of a variety of algorithms. For example, for least mean squares (LMS) filter, there may be filter tap coefficients named $C_{xx}$, $C_{yx}$, $C_{xy}$, $C_{yy}$ that are updated by an update algorithm expressed by the following equations when taking the feedback delay in consideration, where the x, y subscripts refer to x, y polarizations of the original modulated optical signal.

$$C_{xx}(n+1) = C_{xx}(n) - \mu r^*_{x,n-FD}\varepsilon_{x,n-FD}$$

$$C_{yx}(n+1) = C_{yx}(n) - \mu r^*_{y,n-FD}\varepsilon_{x,n-FD}$$

$$C_{xy}(n+1) = C_{xy}(n) - \mu r^*_{x,n-FD}\varepsilon_{y,n-FD}$$

$$C_{yy}(n+1) = C_{yy}(n) - \mu r^*_{y,n-FD}\varepsilon_{y,n-FD}$$

Using the adaptive filter, measures of the error per frequency bin are available. The error can be used for performing cross-correlation for updating the filter taps of the adaptive filter. Other examples of alternative types of adaptive filtering algorithms include recursive least-square, or constant modulo amplitude.

A weight processing module 320 uses information from the modules 314 to dynamically compute weights used for performing weighted CPE estimation. In addition to the measures of error described above, measures of the decoded signal strength are available and provided to the weight processing module 320. Together these signal and error measures are used by the weight processing module to compute measures of signal-to-noise ratio (SNR) associated with different frequency bins. The weight processing module 320 computes the respective weights associated with the different frequency bins based on the respective SNRs computed for those frequency bins. The inputs used to determine the error and signal strength measures can be acquired from various locations in the system, including before or after the adaptive filtering, so the weighted CPE estimation technique is independent from the specific arrangement of the modules 314 performing clock recovery. In some implementations, the weight processing module 320 operates using a slower (e.g., decimated) digital clock signal to save power. For some channel conditions, the system may provide sufficient improvement by updating weights less often than every clock signal of the DSP module 312. For example, the changing channel conditions being tracked may be based on a change in temperature, which may change relatively slowly. Or, if the cause of the changing channel conditions is unknown, the weights may be programmed to be updated more often, potentially based on a power constraint for the system.

Various techniques can be used to compute the updated weights. Typically, there is one weight per pair of frequency elements of the summand that appears in the sum used for CPE estimation, and the weight is based on the combination of, or selection between, the SNRs of the two of lower and upper side frequency bins. Examples of different functions that can be used to compute a weight Weight(i) for each frequency bin i include a minimum of the SNR values for the upper frequency component and lower frequency component, or an average of the SNR values for the upper frequency component and lower frequency component:

$$\text{Weight}(i) = \min(SNR(X_{U,i}), SNR(X_{L,i}))$$

$$\text{Weight}(i) = \text{avg}(SNR(X_{U,i}), SNR(X_{L,i}))$$

Alternatively, other functions can be used. A function can also be applied to the SNR, such as a logarithmic function log 2(1+SNR). Any diversity classification method, such as selection and maximal ratio combiner (MRC), can be used to optimize weights based on SNR.

Figure 4:
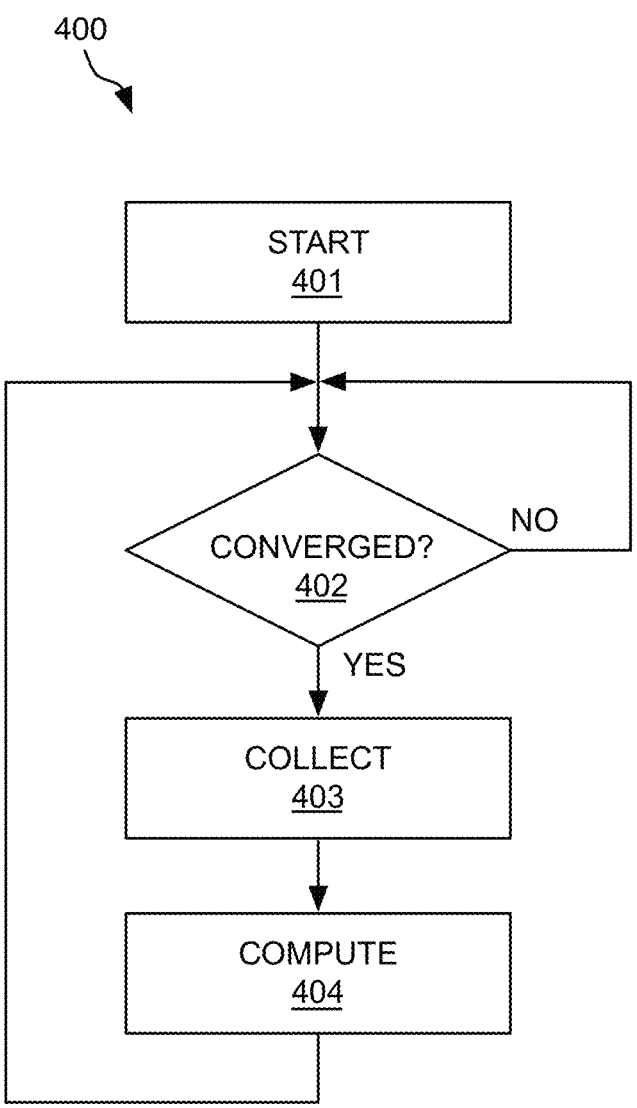
FIG. 4 is a flowchart for an example weight update procedure.

FIG. 4 shows an example of a procedure 400 that can be used by the DSP module 312 to provide updated weights. After the procedure 400 starts (401), the DSP module 312 performs a convergence check (402) of the adaptive filter. If the filter has not converged, then the DSP module 312 stays in a loop to repeatedly perform the check (402). If the filter has converged, then the DSP module 312 collects (403) SNR measurements for frequency bins in the upper and lower sideband roll-off regions. After collecting the SNR measurements, the DSP module 312 uses the weight processing module 320 to compute (404) updated weights.

The weights from the weight processing module 320 are provide to a CPE estimation module 318. The CPE estimation module 318 can be programmed to compute the CPE estimate using any of a variety of different types of summations over the frequency bins of the upper and lower sideband roll-off regions. Equations (5) and (6) show examples that explicitly shows complex noise terms $N_{U,i}$ and $N_{L,i}$ added to each of the upper and lower frequency elements, respectively. Equation (5) below uses an angle of a weighted average of pairs of frequency elements multiplied together (with the lower frequency element conjugated to yield a difference among phase angles).

$$\hat{\varphi} = \frac{N}{G} \angle \left( \frac{1}{N_{SSB}} \sum_{i=1...K} \text{Weight}(i)(X_{U,i} + N_{U,i})(X_{L,i}^* + N_{L,i}^*) \right) \quad (5)$$

As the index i varies from 1 to K, the upper frequency component $X_{U,i}$ varies over the frequency bins of the upper sideband roll-off region 202U from high frequencies to low frequencies, and the lower frequency component $X_{L,i}$ varies over the frequency bins of the lower sideband roll-off region 202L from low frequencies to high frequencies. In some implementations, the symmetry of the regions 202L and 202U are such that the upper and lower frequency components are at frequencies that are equally distant from the center carrier frequency.

Alternatively, equation (6) below uses a weighted average of angles of pairs of frequency elements multiplied together (with the lower frequency element conjugated to yield a difference among phase angles).

$$\hat{\varphi} = \frac{N}{G} \left( \frac{1}{N_{SSB}} \sum_{i=1...K} \text{Weight}(i) \angle [(X_{U,i} + N_{U,i})(X_{L,i}^* + N_{L,i}^*)] \right) \quad (6)$$

Figure 3B:
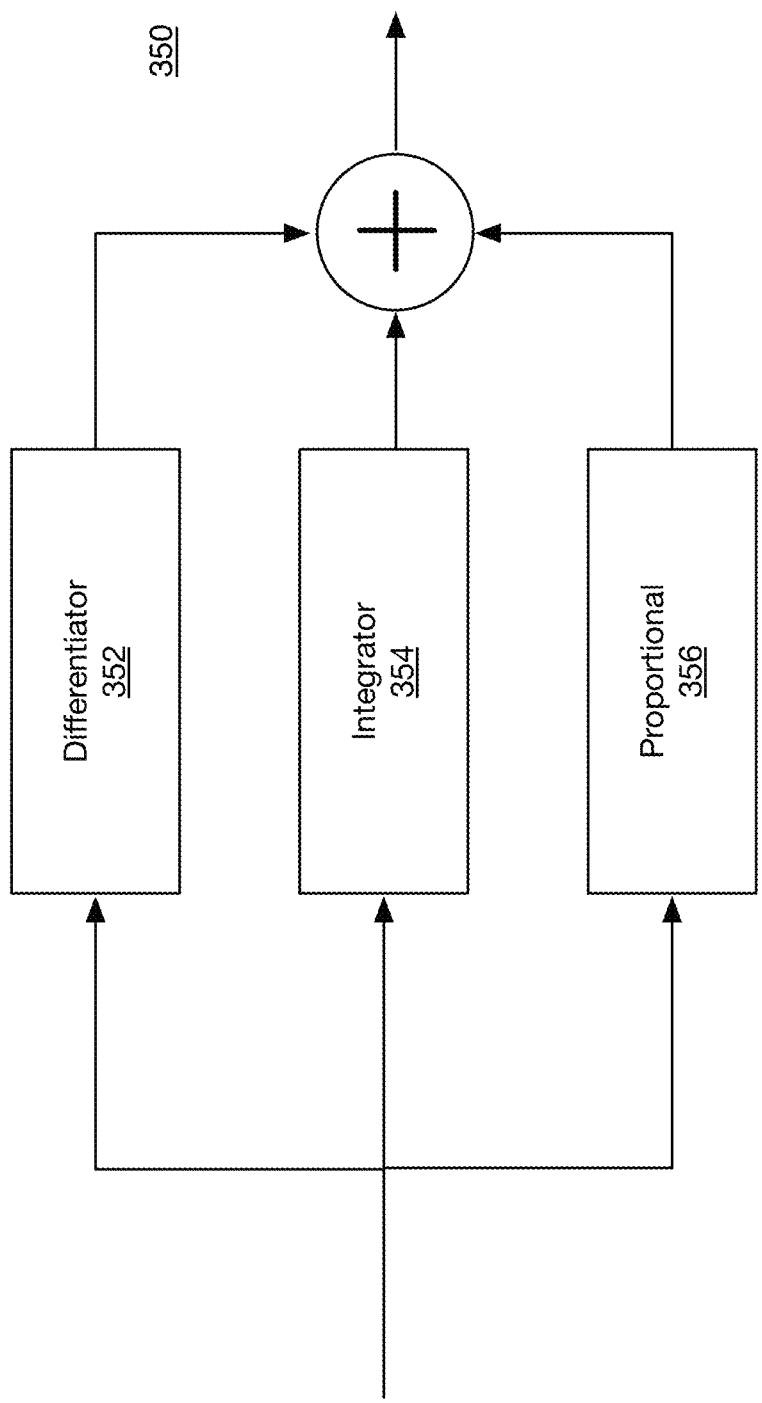
FIG. 3B is a block diagram of example control circuitry.

The resulting CPE estimate is provided to a control module 316 that distributes the CPE estimate as needed, and in the appropriate form. The control module 316 provides a smoothing mechanism that can drive phase adjustments for one or both of: adjusting an analog clock, or adjusting sampling in a digital technique such as digital interpolation. The adjustments can be applied in a feedback and/or feedforward arrangement. In this example, the control module 316 provides the CPE estimate in digital form to clock recovery circuitry (e.g., to adjust interpolation sampling), and in analog form to the PLL 310 (e.g., for adjusting a VCO). The gain settings in the control module 316 can also be adjusted based on the aggregated information used by the weight processing module 320 to compute the weights, such as the SNR associated with different bins (e.g., an average SNR of the whole spectrum 204 of the signal, or any portion of the spectrum). For example, information can be used to aid the control module 316 govern the tracking bandwidth of one or more control loops using at least some circuitry of the DSP module 312. FIG. 3B shows an example of modules for a PID controller 350 that can be used in such control loops, where the controller 350 includes a differentiator module 352, an integrator module 354, and a proportional module 356 whose outputs are combined to provide a control signal. Alternatively, any type of digital or analog control mechanism with programmable gain settings can form the control module 316 and have its control loop gains adjusted based on signal SNR.

Figure 5A:
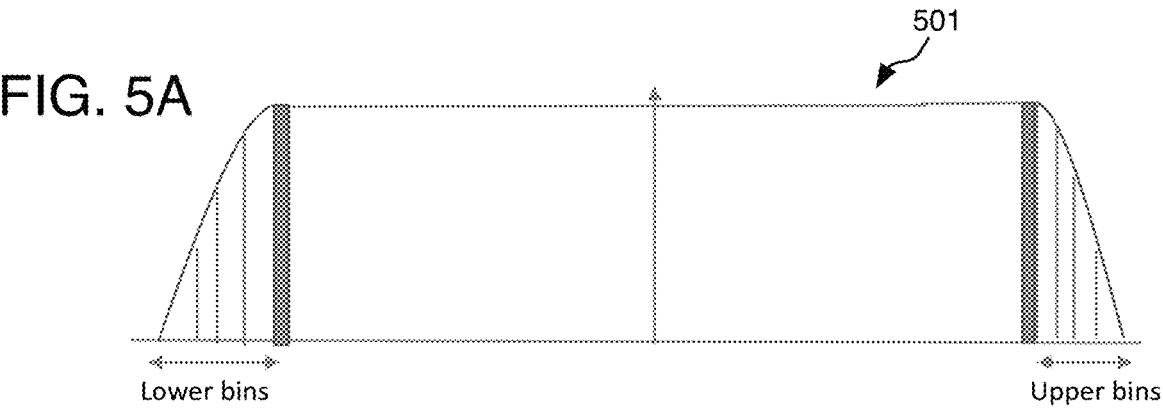
FIGS. 5A, 5B, and 5C are plots of example spectra for single-carrier/single-spectral band, single-carrier/multiple-spectral band, and multi-carrier/multiple-spectral band modulation schemes, respectively.
Figure 5B:
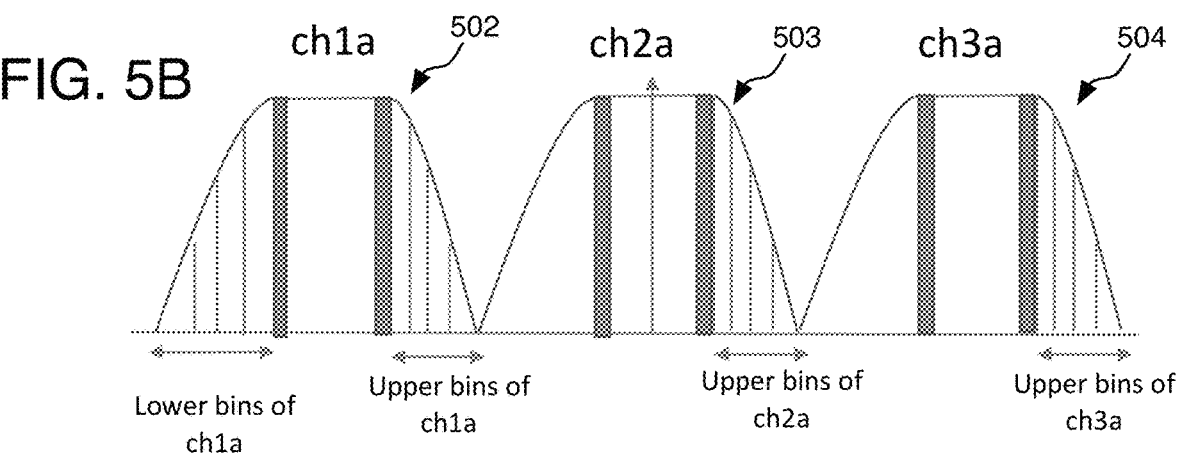
Figure 5C:
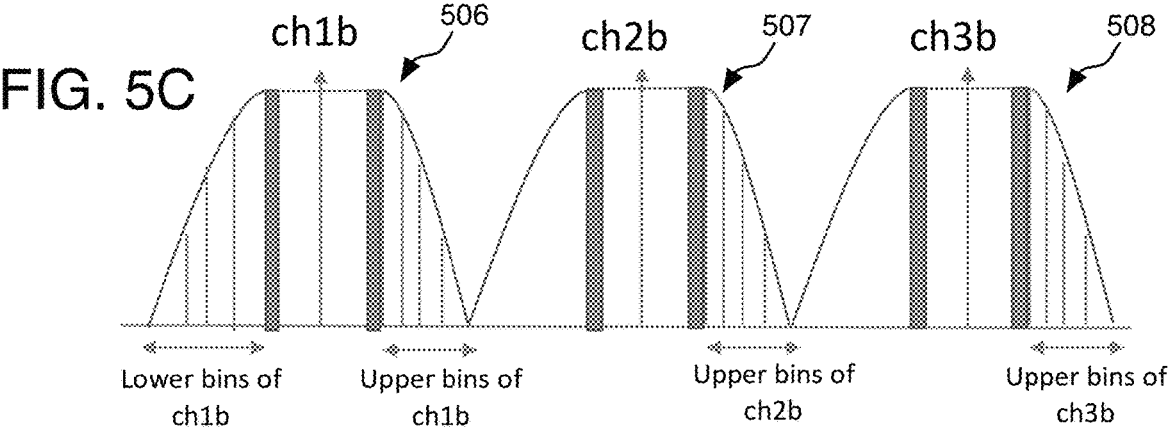

In some implementations, there may be multiple carriers used for different channels in a frequency division multiplexing scheme. Referring to FIG. 5A, a single-carrier spectrum 501 consisting of a single relatively wide spectral band based on a modulated source carrier wave (e.g., corresponding to a wavelength of an optical wave from a laser). Alternatively, referring to FIG. 5B, the source carrier wave can be digitally modulated using a digital FDM scheme in which there are multiple spectral bands associated with respective carrier frequencies for channel 1 (ch1a) 502, channel 2 (ch2a) 503, and channel 3 (ch3a) 504 for three virtual carriers. Alternatively, referring to FIG. 5C, there can be multiple source carrier waves modulated using a multi-carrier FDM scheme in which there are multiple spectral bands associated with respective carrier frequencies for channel 1 (ch1b) 506, channel 2 (ch2b) 507, and channel 3 (ch3b) 508 for three physical carriers. Each spectral band for the different channels is shaped separately with lower and upper sidebands that can be used for CPE estimation.

In either the physical multi-carrier case or the virtual multi-carrier case, the different carrier frequencies can be modulated at the transmitter 102 using a common clock, which is recovered at the receiver 106. The following equation (7) shows an example of CPE estimation for a multi-carrier case (with M physical or virtual carriers, where c=1 . . . M).

$$\hat{\varphi} = \frac{N}{G} \left( \frac{1}{N_{SSB}} \sum_{c=1}^{M} \sum_{i=1...K} \text{Weight}(i) \angle [(X_{U,i} + N_{U,i})(X_{L,i}^* + N_{L,i}^*)] \right) \quad (7)$$

The weights can depend on which carrier frequency is being used, or can be independent of the carrier frequency. In some cases, the lower sideband roll-off region of one channel may overlap with the upper sideband roll-off region of a neighboring channel. Or, as channels spacing gets smaller, there may be leaked power from one channel to the neighboring channel that reduces the SNR in certain frequency bins, leading to a noisier CPE estimate. Such overlap and/or leakage may be undesirable, but if present could be mitigated by appropriate setting of the weights for certain frequency bins. The techniques described herein can detect such a decrease in SNR in those frequency bins and mitigate the effect on the CPE estimate by reducing the weight of the edge bins and adding more weight to other bins.

In similar fashion as equation (1), the weighting techniques are applicable to other frequency-domain clock phase error detectors such as "square-law of nonlinearity" detectors, BPSK/QPSK timing-error detectors such as described in Gardner, "A BPSK/QPSK Timing-Error Detector for Sampled Receivers," IEEE Transactions on Communications, Vol. COM-34, No. 5, May 1986, incorporated herein by reference.

The weighting techniques can be applied to the power of the signal derived from the time-domain representation of the signal as in equation (8).

$$P = \text{FFT}(xx^*) \quad (8)$$

The phase error can then be calculated based on the correlation of the upper power components and lower power components as shown in equation (9).

$$\hat{\varphi} = \Sigma_{i=1...K} \text{Weight}(i) \text{Img}[(P_{U,i})(P_{L,i}^*)] \quad (9)$$

Practically, due to fixed-point implementation, the performance of the CPE estimation can be a function of the root mean square (RMS) over the frequency bins. Therefore, it may be desirable to manage the following quantity based on an optimality criterion (e.g., as function of the digital settings).

$$\text{Min}(OptimalTotalEnergy_{Hardware}) <$$

$$\sum_{i=1...K} \text{Weight}(i)(X_{U,i} + N_{U,i})(X_{L,i}^* + N_{L,i}^*) <$$

$$\text{Max}(OptimalTotalEnergy_{Hardware})$$

The OptimalTotalEnergy quantity can be pre-determined based on chosen hardware settings. This option enables flexibility in CPE estimation based on the configuration chosen by the data-path (e.g., ADC Automatic Gain Control target, Filter scaling, peak to RMS supported).

In some implementations, the relative values of the different weights over the sum used to compute the CPE estimate are selected to satisfy a particular constraint, such as the following constraint that ensures the sum of the weights over the bins is equal to a constant C.

$$\sum_{i=1...K} \text{Weight}(i) = C$$

The optimal value of the constant C may depend on the hardware and a corresponding energy associated with certain components that use a fixed-point representation for achieving a particular resolution. If the energy into certain components is too high, saturation may result, or if the energy is too low, there may be too much quantization noise. So, the constant is selected so that the weights are scaled to bring the summation into a particular range of an input that receives the CPE estimate. In some implementations, a threshold can be set so that weights that would be scaled to have a value below that threshold can instead simply be set to zero.

If the noise terms are equal, white noise term over the spectrum being used, then using scaling the channels with the SNR directly (with highest SNR as reference) may yield an optimal CPE estimate based on certain optimality criteria. Such an assumption may not be appropriate for all systems, such as a gridless multi-carrier FDM scheme with squeezed neighbor channels where some frequency bins have more noise leaked, on top of amplified spontaneous emission (ASE) noise, compared to others.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for managing clock-data recovery for a modulated signal from a communication channel, the apparatus comprising:
    an input module configured to receive the modulated signal and provide one or more analog signals;
    one or more analog-to-digital converters (ADCs) configured to provide one or more digital input streams from samples of the analog signals; and
    a digital signal processing module configured to process the digital input streams to provide decoded digital data, the processing comprising:
        determining the decoded digital data based on information modulated over a plurality of frequency elements associated with the modulated signal, based at least in part on transforms of the digital input streams;
        determining a clock signal based on clock recovery from the digital input streams; and
        determining a clock phase error estimate associated with the determined clock signal based at least in part on a sum that includes different weights multiplied by different respective summands corresponding to different sets of frequency elements.

2. The apparatus of claim 1, wherein one or more of the weights are determined based at least in part on measurements characterizing one or more conditions of the communication channel.

3. The apparatus of claim 2, wherein the measurements include a plurality of measurements of signal-to-noise ratio (SNR) for different respective frequency elements.

4. The apparatus of claim 3, wherein at least a first set of frequency elements of the different sets of frequency elements comprises a pair of frequency elements including: a first frequency element associated with a frequency within a lower roll-off region of a frequency spectrum of the modulated signal, and a second frequency element associated with a frequency within an upper roll-off region of the frequency spectrum.

5. The apparatus of claim 4, wherein at least one weight multiplied by a first summand corresponding to a first set of frequency elements comprises a function of: a first measurement of SNR for the first frequency element, and a second measurement of SNR for the second frequency element.

6. The apparatus of claim 5, wherein the function comprises at least one of: an average, or a minimum.

7. The apparatus of claim 4, wherein at least one summand corresponding to the first set of frequency elements comprises a phase difference between the first frequency element and the second frequency element.

8. The apparatus of claim 4, wherein the frequency spectrum of the modulated signal corresponds to a spectral band within a multi-carrier spectrum that includes multiple spectral bands for different respective channels, where each spectral band is modulated around a different respective carrier frequency.

9. The apparatus of claim 8, wherein the multiple spectral bands within the multi-carrier spectrum are modulated around their respective carrier frequencies based on a base carrier signal that is digitally modulated into the different spectral bands.

10. The apparatus of claim 2, wherein the communication channel comprises an optical communication channel that provides an optical wave having a modulated first linear polarization component that is processed to yield a frequency domain representation associated with the plurality of frequency elements, and a modulated second linear polarization component that is processed to yield a frequency domain representation associated with the plurality of frequency elements.

11. The apparatus of claim 10, wherein the one or more conditions include at least one of a condition associated with a time-dependent frequency response, a condition associated with polarization mode dispersion, a condition associated with polarization dependent loss, a condition associated with optical-to-electrical signal conversion, a condition associated with electrical-to-optical signal conversion, a condition associated with digital-to-analog conversion, or a condition associated with analog-to-digital conversion.

12. The apparatus of claim 2, wherein the communication channel comprises a wireless communication channel that provides a modulated electromagnetic wave processed to yield a frequency domain representation associated with the plurality of frequency elements, wherein the one or more conditions include a condition associated with frequency-selective fading.

13. The apparatus of claim 1, where the processing further comprises
providing the clock phase error estimate as feedback for the clock recovery; and
providing the clock phase error estimate for data sampling by one or more of the ADCs.

14. The apparatus of claim 1, wherein one or more of the weights are determined repeatedly.

15. The apparatus of claim 14, wherein a frequency at which the weights are determined is programmatically determined to be lower than a frequency at which the clock phase error estimate is determined.

16. The apparatus of claim 1, wherein each of the weights is compared to a programmable threshold to determine whether the weight is set to zero based on the comparison.

17. The apparatus of claim 1, wherein the weights are determined such that a sum of all of the weights is scaled to ensure that a magnitude of the clock phase error is within a predetermined range.

18. The apparatus of claim 1, wherein a gain of at least one control loop associated with the digital signal processing module is adjusted based on a signal-to-noise ratio characterizing at least a portion of at least one of the digital input streams.

19. A method for managing clock-data recovery for a modulated signal from a communication channel, the method comprising:
receiving the modulated signal and provide one or more analog signals;
providing one or more digital input streams from samples of the analog signals; and
processing the digital input streams to provide decoded digital data, the processing comprising:
determining the decoded digital data based on information modulated over a plurality of frequency elements associated with the modulated signal, based at least in part on transforms of the digital input streams;
determining a clock signal based on clock recovery from the digital input streams; and
determining a clock phase error estimate associated with the determined clock signal based at least in part on a sum that includes different weights multiplied by different respective summands corresponding to different sets of frequency elements.

20. The method of claim 19, wherein one or more of the weights are determined based at least in part on measurements characterizing one or more conditions of the communication channel.

* * * * *